United States Patent [19]
Allen et al.

[11] Patent Number: 5,519,863
[45] Date of Patent: May 21, 1996

[54] NOTIFICATION FORWARDING DISCRIMINATOR

[75] Inventors: Wade C. Allen, Durham; Mark C. Zelek, Cary, both of N.C.

[73] Assignee: International Business Machines Corporation, Armonk, N.Y.

[21] Appl. No.: 309,835

[22] Filed: Sep. 21, 1994

[51] Int. Cl.$^6$ ........................................................ G06F 9/46
[52] U.S. Cl. ........................................ 395/650; 364/DIG. 1; 364/281.3; 364/280; 364/284.3
[58] Field of Search ........................................ 395/650, 700

[56] References Cited

U.S. PATENT DOCUMENTS

| | | | |
|---|---|---|---|
| 5,049,873 | 9/1991 | Robins et al. | 340/825.06 |
| 5,060,150 | 10/1991 | Simor | 395/650 |
| 5,093,912 | 3/1992 | Dong et al. | 395/650 |
| 5,204,955 | 4/1993 | Kagei et al. | 395/575 |
| 5,218,680 | 6/1993 | Farrell et al. | 395/325 |
| 5,223,827 | 6/1993 | Bell et al. | 340/825.06 |
| 5,388,266 | 2/1995 | Frey et al. | 395/700 |
| 5,390,328 | 2/1995 | Frey et al. | 395/650 |
| 5,465,359 | 11/1995 | Allen et al. | 395/700 |

*Primary Examiner*—Kevin A. Kriess
*Attorney, Agent, or Firm*—Homer L. Knearl

[57] ABSTRACT

Problems with prior OSI (Open Systems Interconnected) event forwarding discriminators (EFD) are solved in accordance with this invention by creating a new type of EFD, called a notification forwarding discriminator (NFD). An NFD works just like an EFD in that it receives notifications emitted by managed objects and determines what types of notifications should be forwarded. However, the forwarding mechanism in an NFD is completely different. An NFD has two operations that a management application can use to control subscription to notifications, "start" and "stop". An NFD forwards notifications via responses to a solicited "start" operation without signaling the end of the "start" operation. Hence, a "start" operation will always be pending completion. The manager and agent track this pending status of operations between a manager and an NFD. Both the manager and agent maintain a pending completion list for each link between a manager and agent. There is a one-to-one correspondence between each manager and the link over which requests go to a given NFD through an agent. Multiple applications using the manager may send multiple start operation requests through the manager, through the agent and to the NFD.

12 Claims, 19 Drawing Sheets

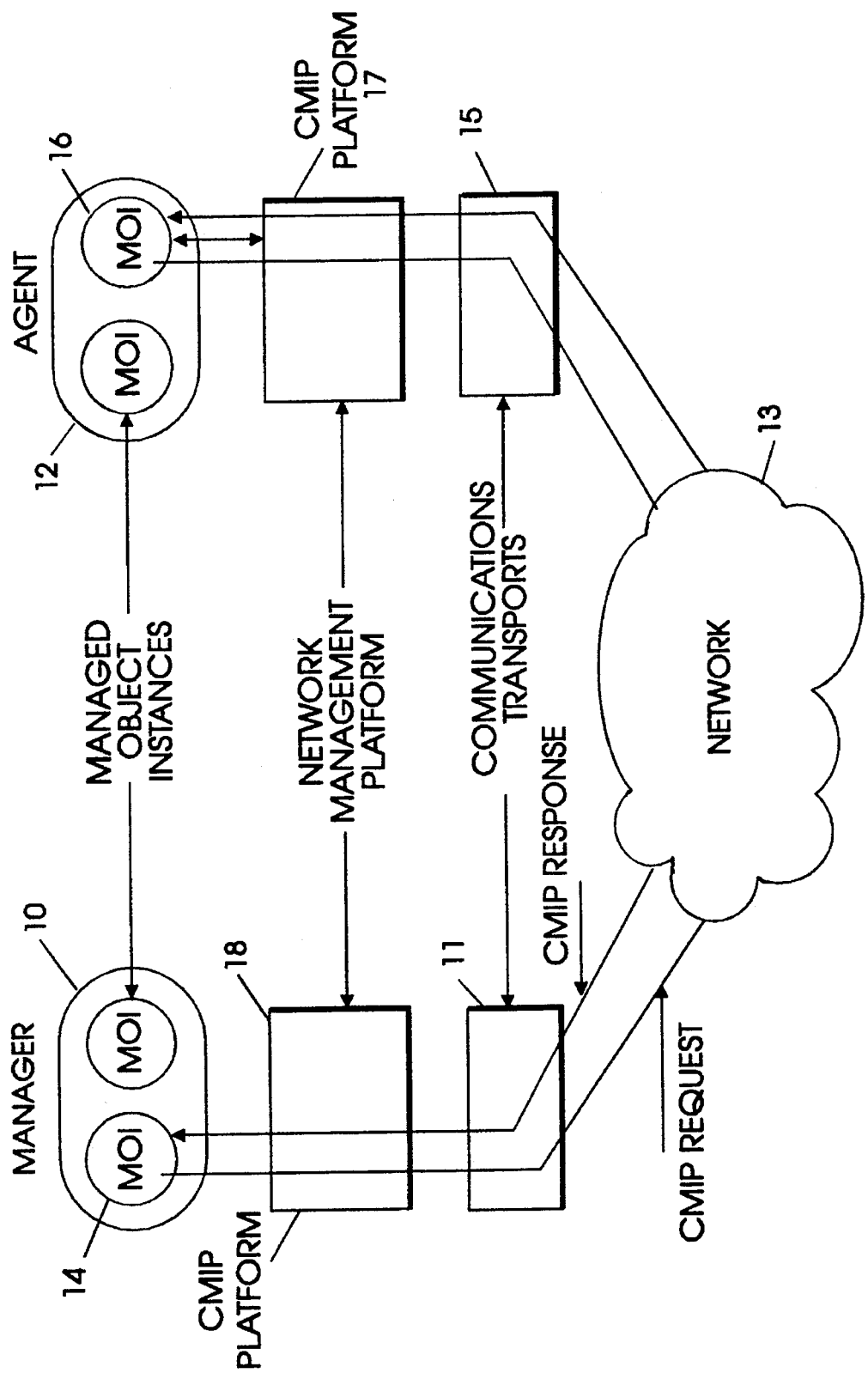

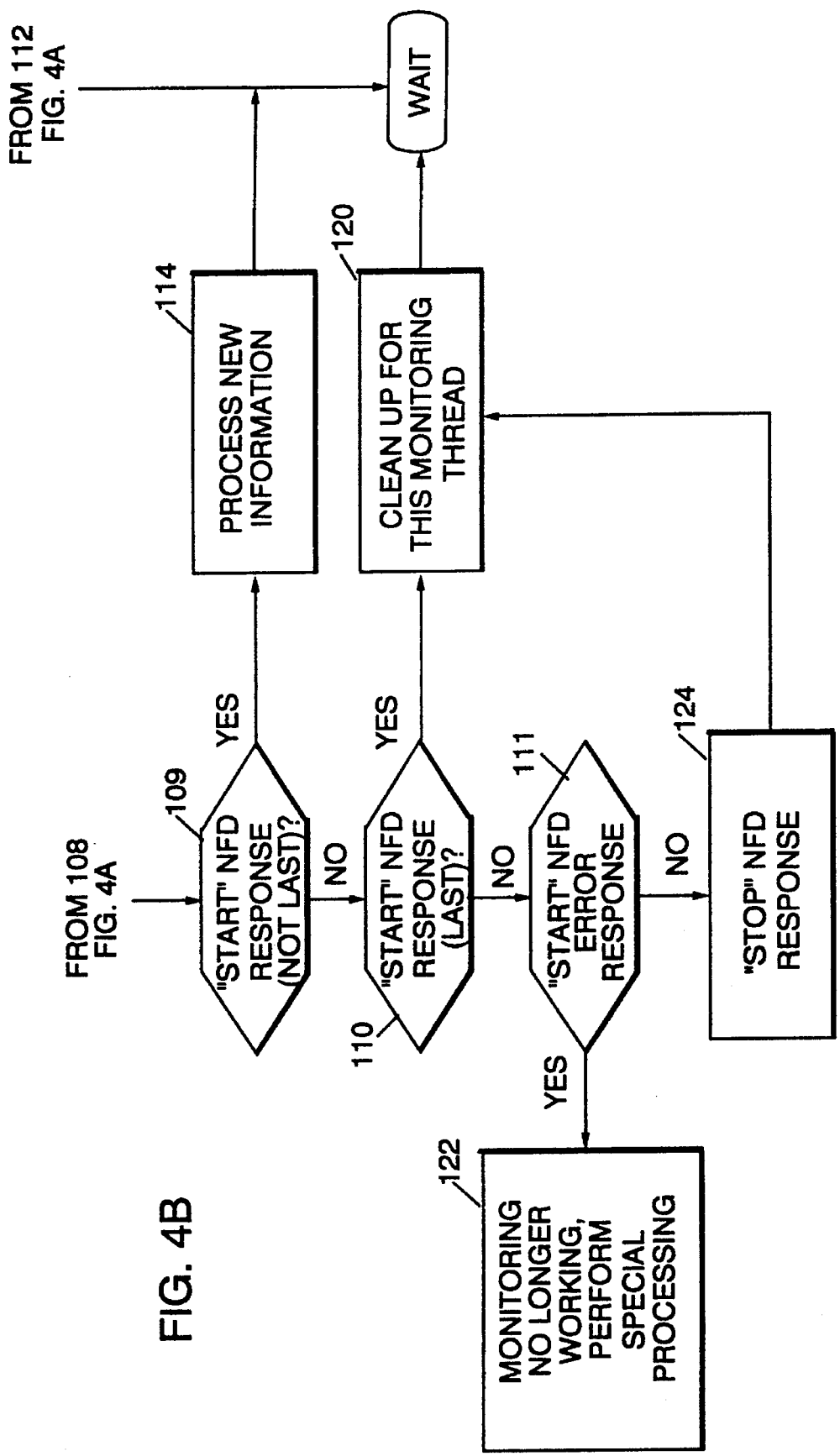

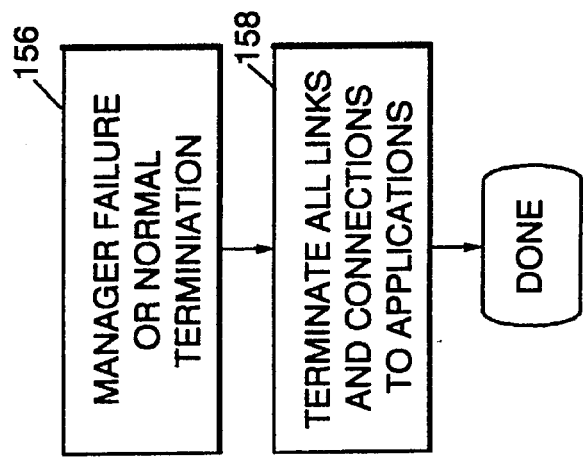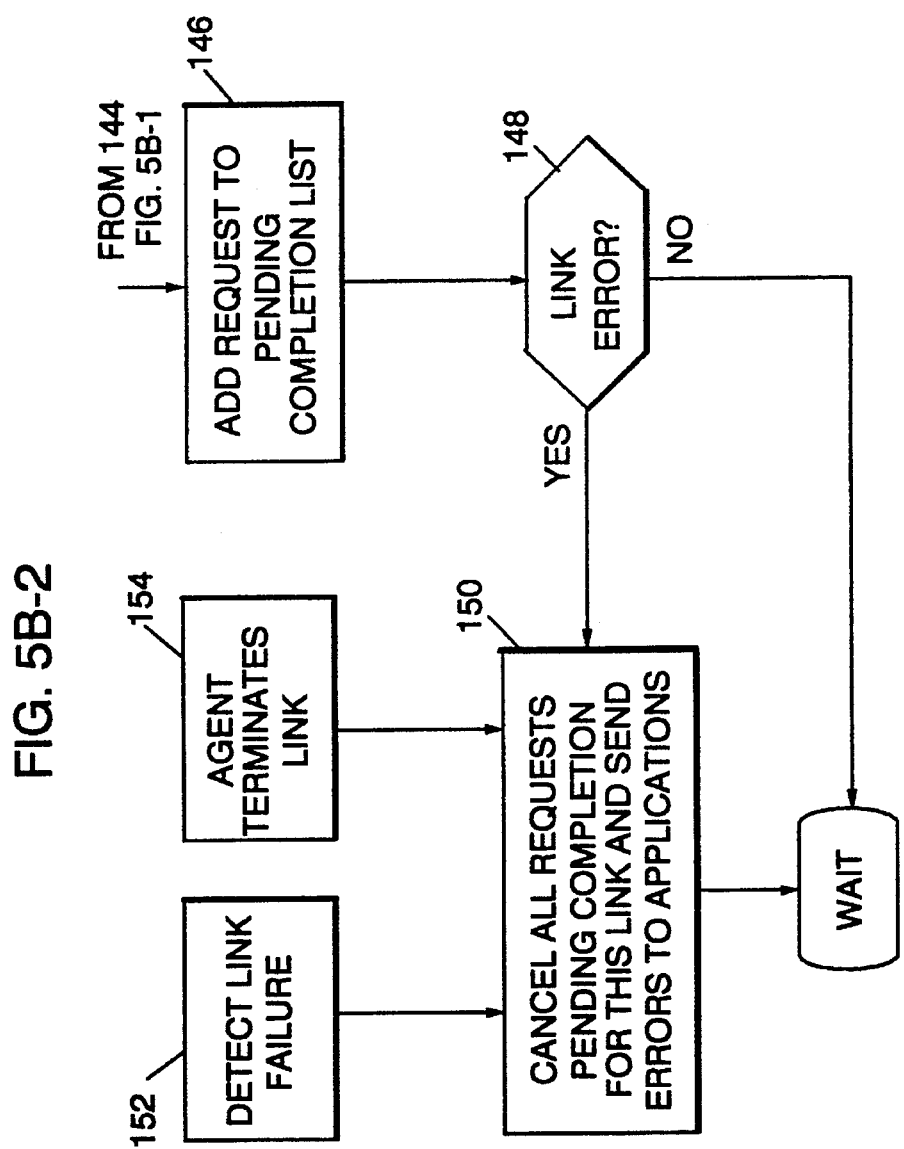

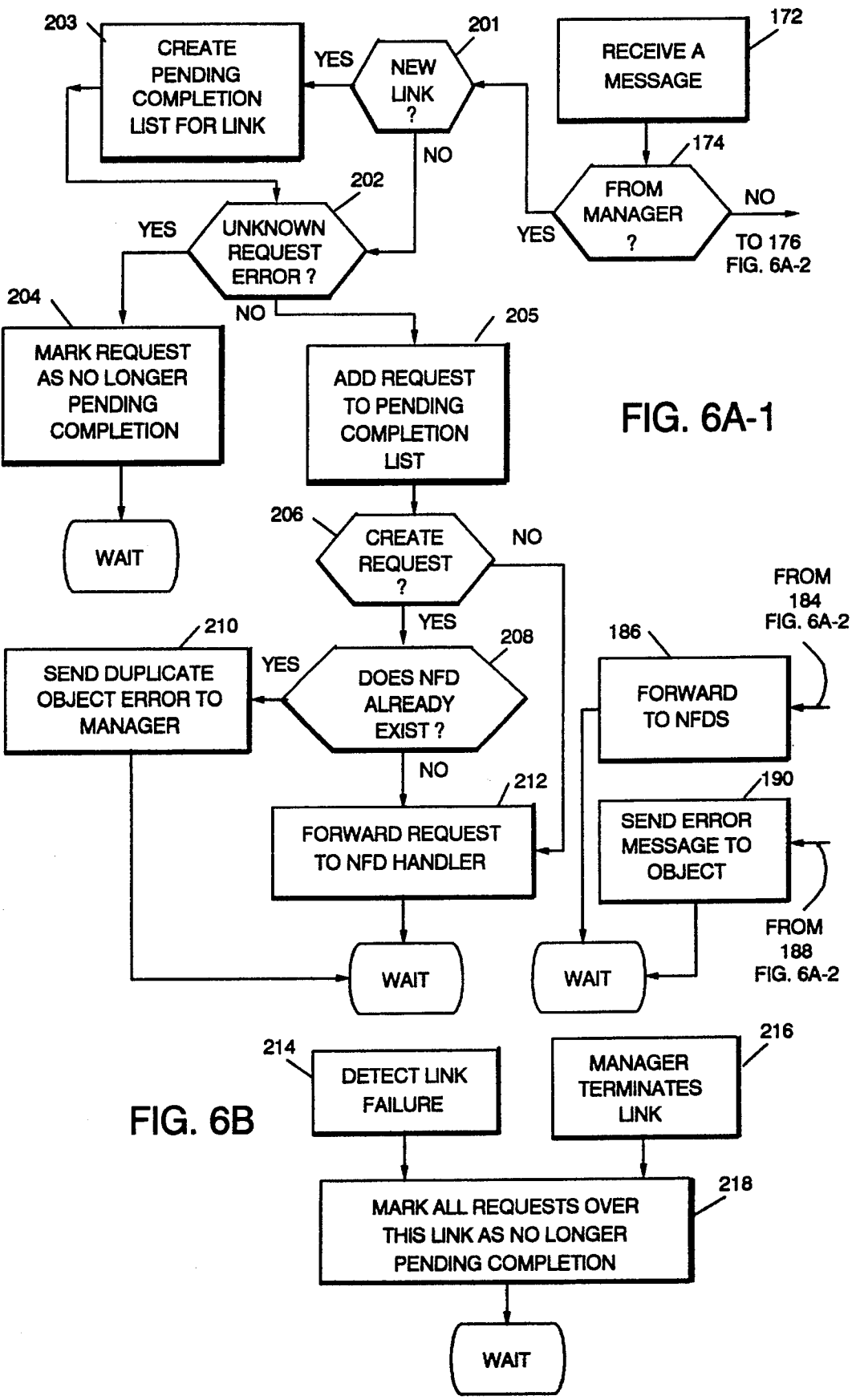

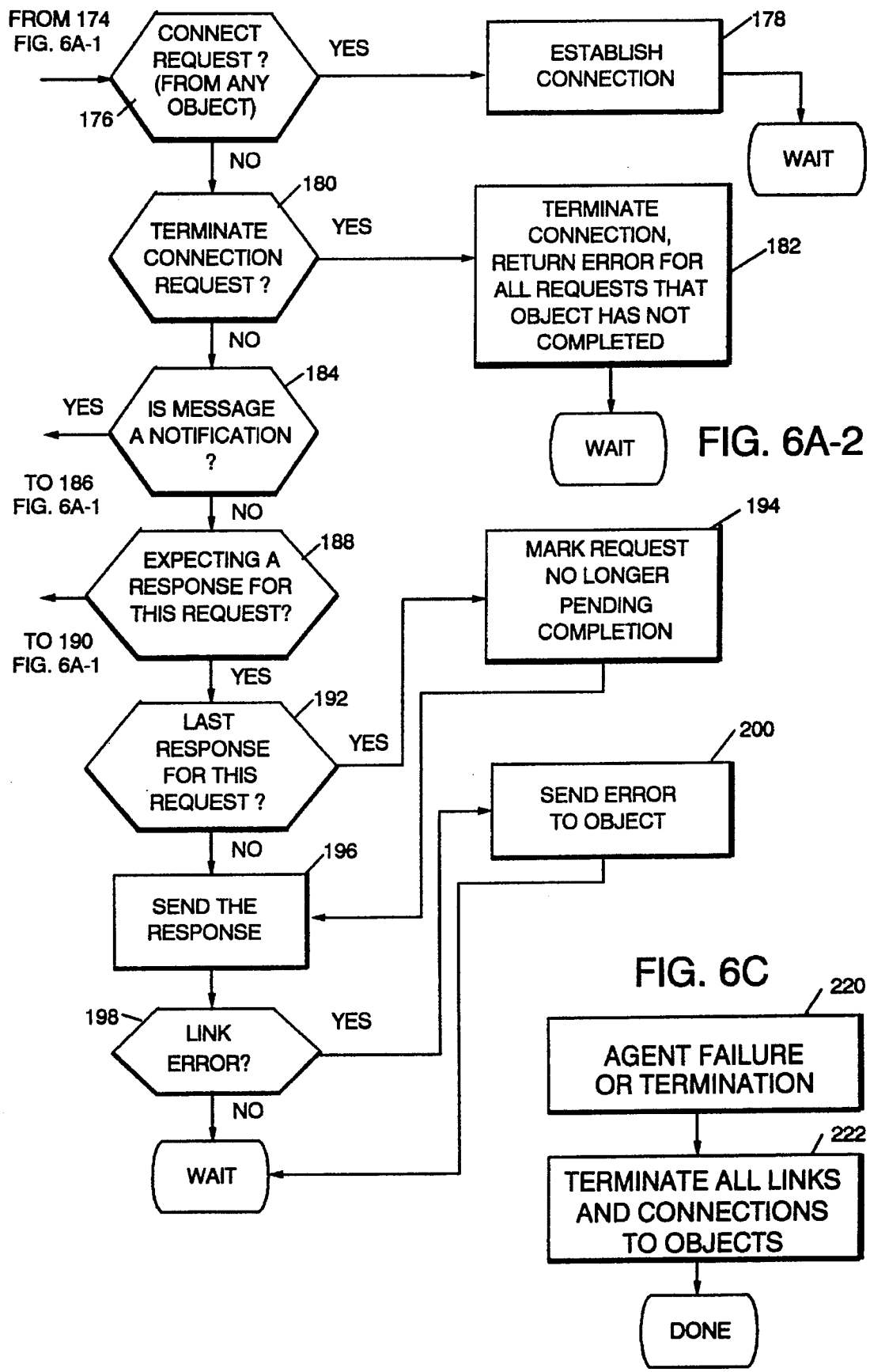

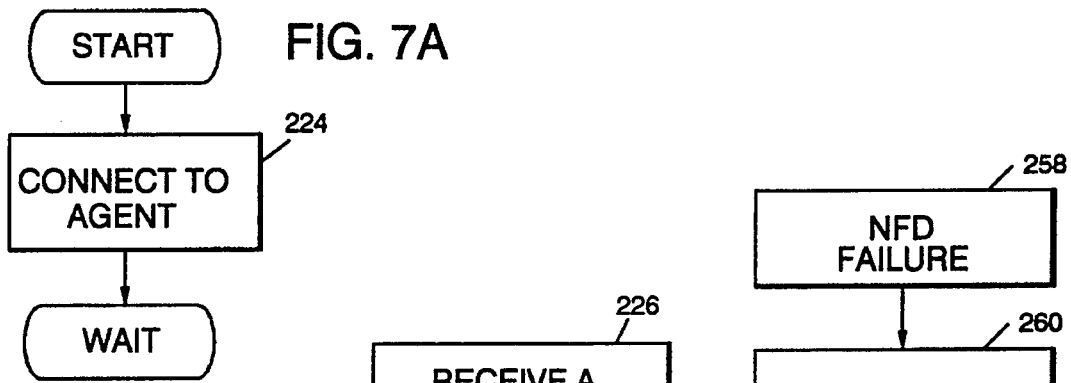
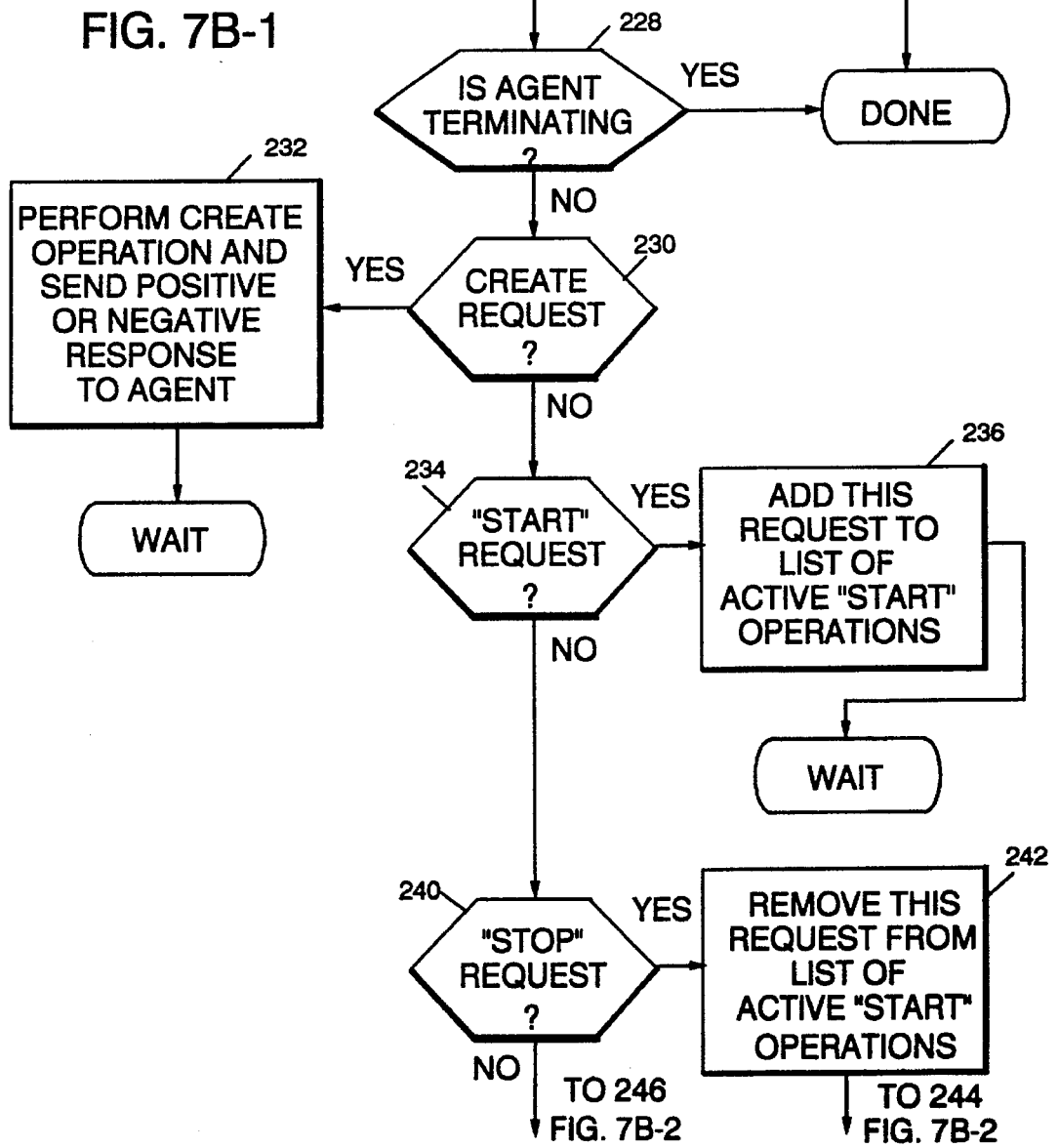
FIG. 7A
FIG. 7B-1

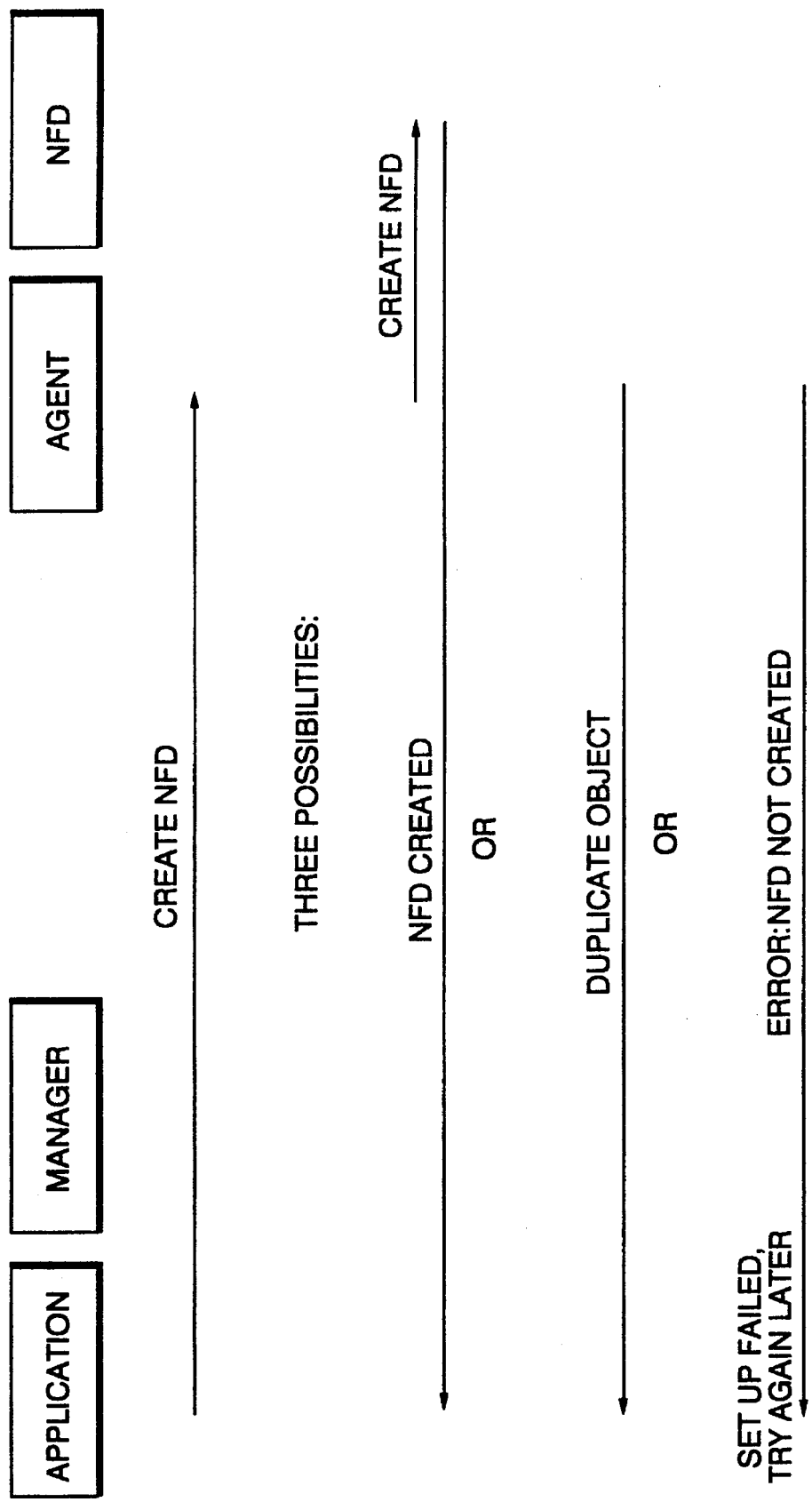

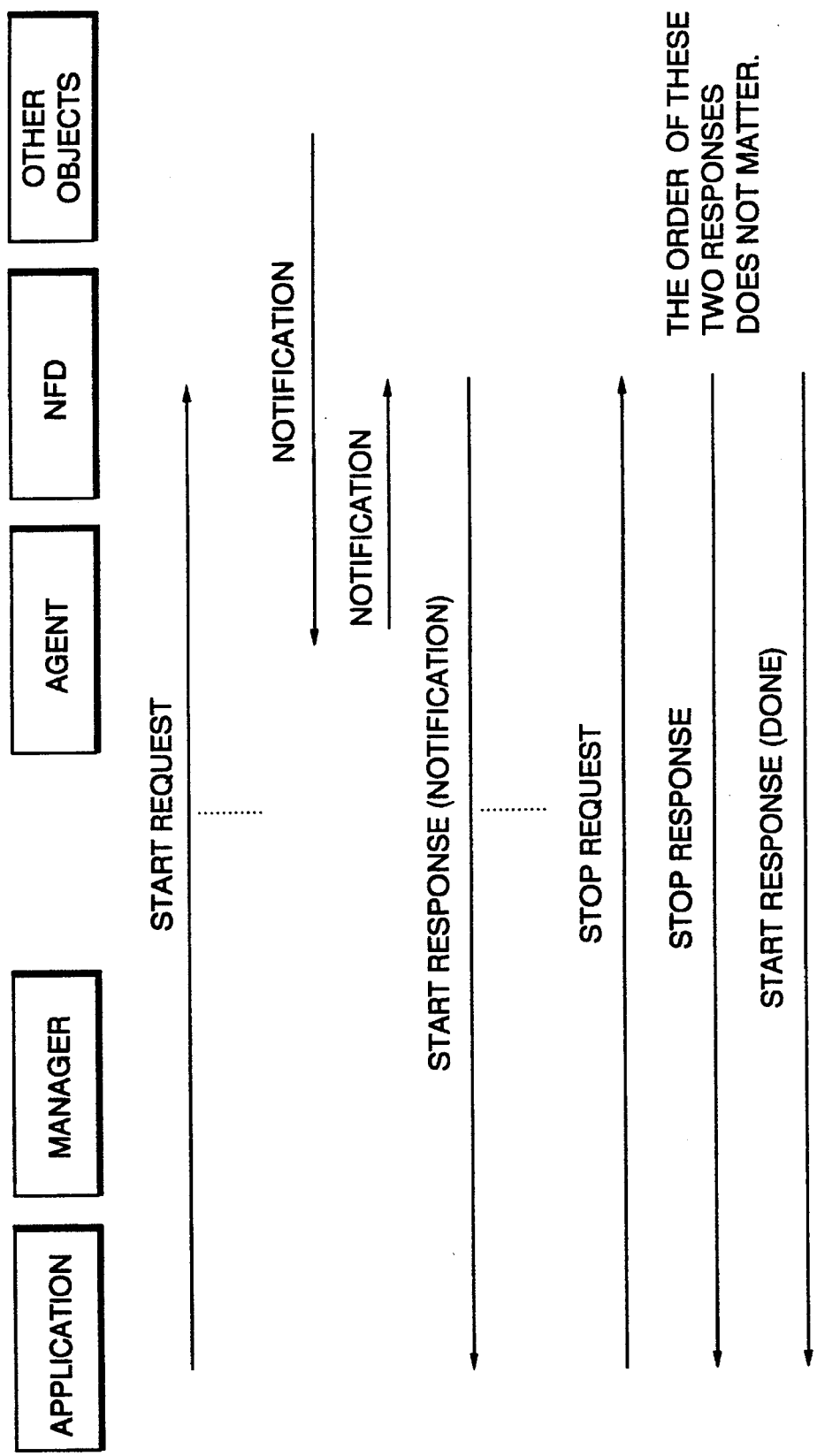

LINK FAILURE

AGENT FAILURE

APPLICATION FAILURE

NOTIFICATION FORWARDING DISCRIMINATOR

BACKGROUND OF THE INVENTION

1. Field of the Invention

This invention is directed to managing certain operations between an Open Systems Interconnection (OSI) manager and agent running on a Common Management Information Protocol (CMIP) platform. More particularly, the invention relates to establishing a Notification Forwarding Discriminator (NFD) at an agent. The manager can turn on this NFD, and leave it on as a monitor until the manager turns it off.

2. Description of Related Art

In OSI standards, managed resources are represented by managed objects, or more particularly managed object instances. Management applications interact with managed objects which in turn interact with the resources they represent. A managed object can report the status of the resource it represents in two ways: In direct response to an operation requesting status information or by emitting an unsolicited message, called a notification, which indicates the resource's status has changed. These options are not mutually exclusive—a managed object may support both methods.

Management applications, which monitor the status of physical resources, need to know that the status information it has is current or that the monitoring mechanism is not working. The two most common approaches to meeting this need using OSI management techniques have substantial problems. The first approach is for a management application to poll all of the managed objects that represent the resources of interest by sending them request operations requesting status information. With this approach, a management application knows when the monitoring mechanism is not working. The application either does not receive a response to a request it has sent (the response "times out"), or the application has returned an error indicating a communication failure. For example, an application monitoring the topology of an APPN communication network could periodically send request operations to managed objects requesting status information. If the application does not receive a response from a particular managed object, it knows that it lacks current status information on that resource and can mark that resource as unreliable.

However, there are two drawbacks to polling. First, a lot of processing time and network traffic are required. Second, as the number of polled managed objects increases, the status becomes less current, as the polling interval must be increased to maintain acceptable network communication performance.

In the second approach, the management application subscribes to the notifications emitted by managed objects. Notifications are peculiar messages because they are not directed to a particular destination. OSI management standards have defined a special managed object, called an Event Forwarding Discriminator (EFD), that receives all notifications emitted by all managed objects on the same system. A management application can set two attributes of an EFD ("discriminatorConstruct" and "destination") to control what types of notifications should be forwarded to it via messages called event reports. Once a management application has set up EFDs on each of the systems it wishes to monitor, it merely waits for an unsolicited event report to arrive. This approach eliminates the network traffic associated with polling, and reduces the processing overhead in the management application. However, it increases processing overhead in the systems where EFDs determine if notifications should be forwarded.

Further, there is a second problem with the EFD approach in that a management application does not know when this monitoring mechanism is no longer working. When a session between a management application and a system with an EFD is lost, there is no way for the application to know that it will not receive any event reports from that EFD, unless it polls the EFDs to make sure that the sessions are still active. While this is not as expensive as polling the managed objects that represent the resources of interest, it becomes less practical as the size of a network increases. In addition, the event reports are unsolicited, so there are no open, or pending, operations as viewed by the management application. An EFD will try to send an event report, but the report will not be delivered. Meanwhile, the management application waits for event reports, unaware that the monitoring mechanism is no longer working. For example, an application monitoring the topology of an APPN network could create EFDs that listen for notifications that indicate a status change and forward them as event reports to the application. The status will be as current as possible until communication is lost. If a transmission group becomes inactive while the communication is lost, the managed object representing the transmission group emits a notification, an EFD processes notification and attempts to forward it as an event report, but the event report cannot be delivered. The management application, completely unaware that there is a problem, still indicates that the transmission group is active.

The OSI management infrastructure hides the details of which sessions are used for communication between managed systems from management applications. Even if the management infrastructure were to inform an application that a session was lost, an application would not know if it was affected by the loss of that session.

Queuing event reports for delivery when communication is re-established does not satisfy the requirement that an application knows when the monitoring is not working.

SUMMARY OF THE INVENTION

It is an object of this invention to maintain status information about a forwarding discriminator in OSI manager and agent applications without polling across the link between manager and agent.

The above problems with prior OSI forwarding discriminators are solved in accordance with this invention by using a variation of the EFD mechanism, called a Notification Forwarding Discriminator (NFD). An NFD works just like an EFD in that it receives notifications emitted by managed objects, and determines what types of notifications should be forwarded (according to the value of the "discriminatorConstruct" attribute).

However, the forwarding mechanism in an NFD is completely different. An EFD forwards notifications via unsolicited event reports to the application(s) specified in the "destination" attribute. A management application can control the notifications it receives by adding its name to, and removing its name from, the "destination" attribute of EFDs. An NFD, on the other hand, does not have a "destination" attribute. Instead, it has two operations that a management application can use to control subscription to notifications, "start" and "stop". An NFD forwards notifications via responses to a solicited "start" operation without signaling the end of the "start" operation. Hence, a "start" operation will always be pending completion. The manager and agent must track this pending status of operations between a manager and an NFD. Both the manager and agent maintain a pending completion list for each link between a manager and agent. There is a one-to-one correspondence between each manager and the link over which requests go to a given NFD through an agent. Multiple applications using the manager may send multiple start operation requests through the manager, through the agent and to the NFD. Each start operation request is added to the pending completion list at both the manager and agent. Operations on the pending completion list are open or pending until either a "last" response is received for the operation, or a "stop" request is issued by the application.

If communication is lost between manager and agent, the manager detects that the link is down, removes the operations pending across that link from the pending completion list at the manager and notifies each application, whose operation was removed from the pending list, of the error. At the agent side, the agent also detects that the link is down, and removes the operations pending across the down link from the pending completion list at the agent. Managed objects are notified of an error by the agent the first time they respond to the pending operation that has now been removed by the agent from the pending completion list.

Accordingly in this invention, the manager and agent always have current status information from the managed object, and application at the manager knows immediately if it has lost contact with the NFD monitoring the managed object. Further, this is accomplished without polling or otherwise loading down the communication network, or applications running on the system. Other advantages and features of the invention will be understood by those of ordinary skill in the art after referring to the complete written description of the preferred embodiments in conjunction with the following drawings.

BRIEF DESCRIPTION OF THE DRAWINGS

FIG. 1 is an overview of a manager application running on a CMIP platform in a first system and an agent application running on a CMIP platform in a second system connected to the first system over a communications network.

FIGS. 4A and 4B, show the application process at the manager for operating with a notification forwarding discriminator in accordance with the invention.

FIGS. 5A, 5B-1, 5B-2, and 5D, show the manager process at the manager CMIP platform for operating with a notification forwarding discriminator in accordance with the invention.

FIGS. 6A-1, 6A-1, and 6C, show the agent application process for operating with notification forwarding discriminators in accordance with the invention.

FIGS. 7A 7B-1 and 7B-2, show the logical operations or process for of a notification forwarding discriminator in accordance with the invention.

FIG. 8 illustrates the data flow between manager application, manager, agent and NFD during initial setup and during recovery.

FIG. 9 illustrates the data flow between manager application, manager, agent, NFD and other managed object instances during initialization, normal operation and termination.

DESCRIPTION OF THE PREFERRED EMBODIMENTS

Figure 2:
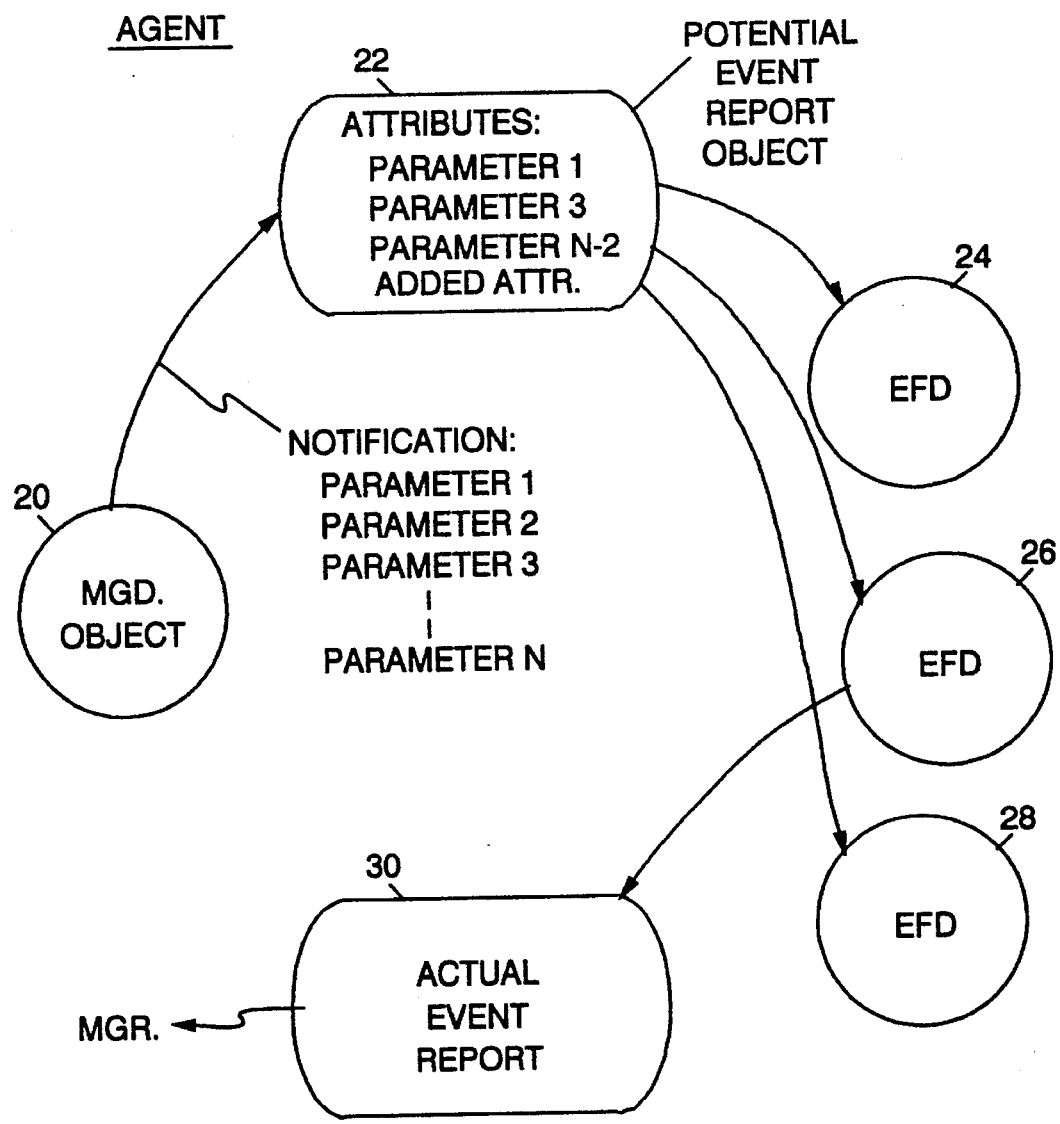
FIG. 2 illustrates the information flow in an agent application using event forwarding discriminators.
Figure 3:
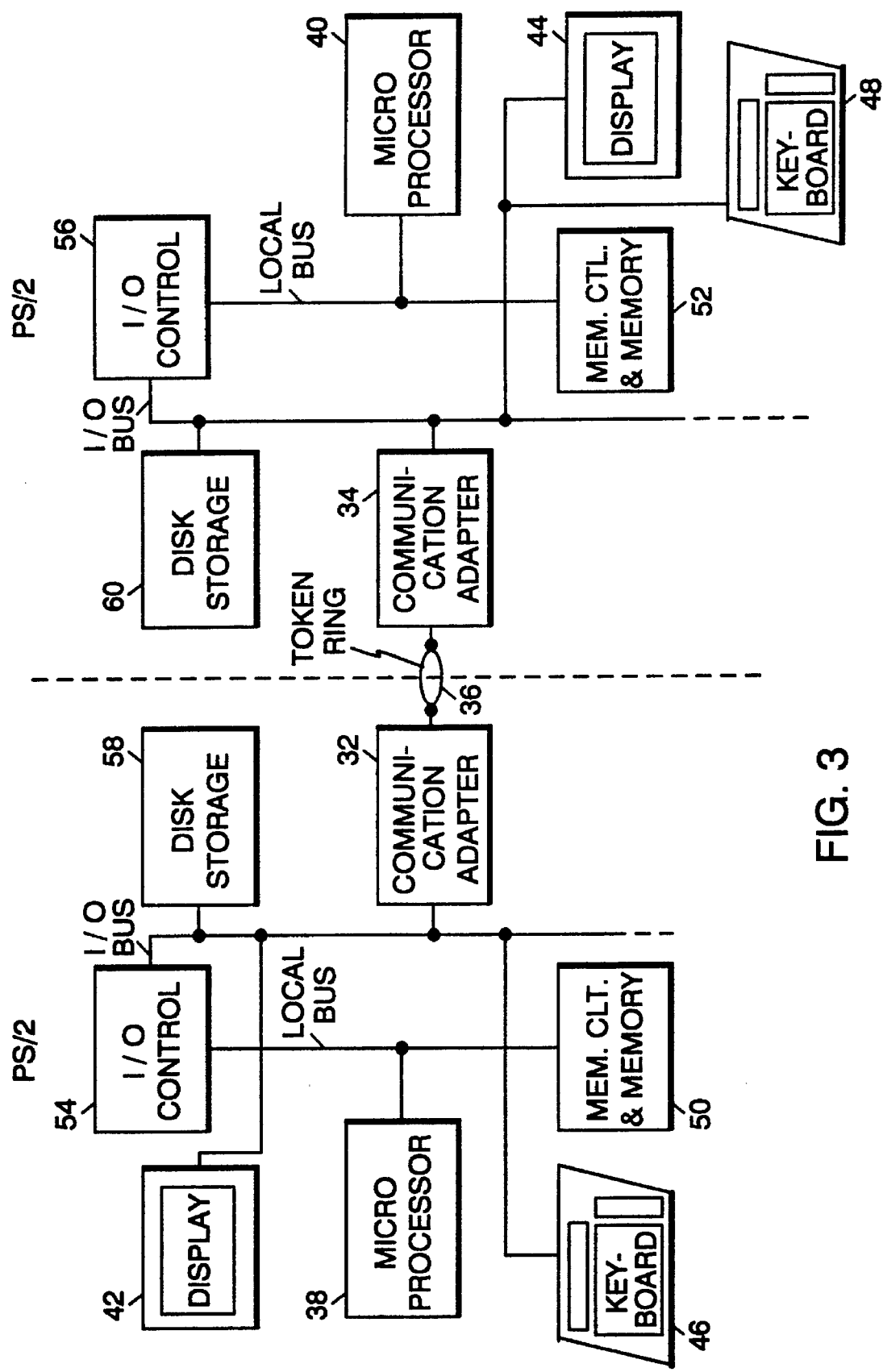
FIG. 3 illustrates one example of the first and second computing systems on which the CMIP platforms and manager and agent application programs are running.
Figures 1, 5B:
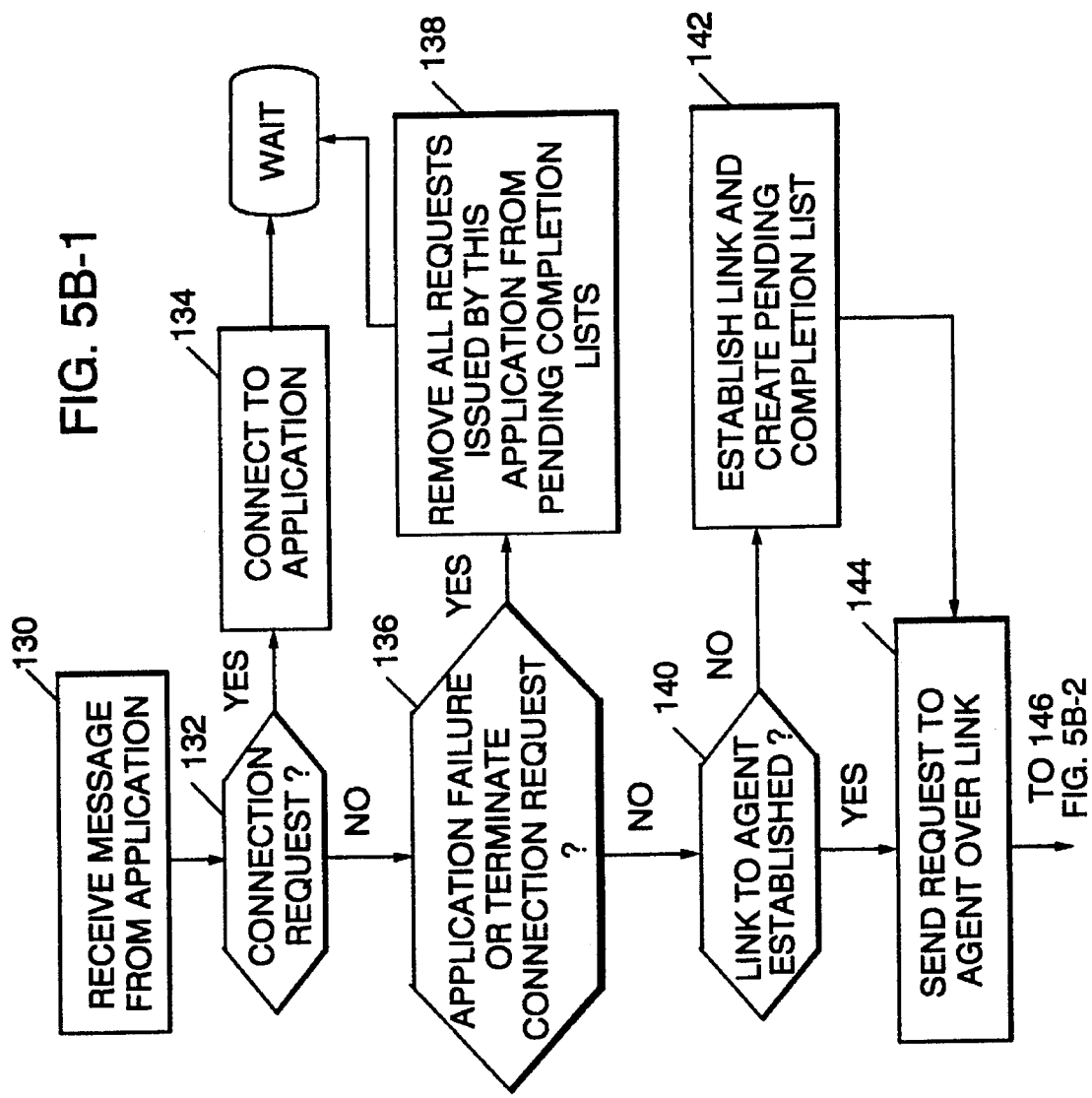

FIGS. 1–3 are exemplary of an operative environment for a preferred embodiment of the invention. In FIG. 1, the manager application 10 is running on an operating system in a first computing system. The agent application 12 is running on an operating system in a second computing system. While this is a typical configuration for manager and agent applications, it is also possible to run the manager and agent applications on the same computing system. A managed object instance 14, in the manager application 10, communicates requests to a managed object instance 16 in agent 12.

Viewing the systems from a software perspective, the requests are passed through the CMIP platform 18 and communication transports 11 in the system where the manager resides. The communication transport 11 sends the requests over a communication network 13 to the communications transport 15 at the agent's computing system. Finally, requests are handled by the CMIP platform 17 working with the agent 12 and the MOI 16. Replies or responses from MOI 16 in the agent 12 are passed back to the manager MOI 14 via CMIP platform 17, transport 15, network 13, transport 11, and CMIP platform 18.

In FIG. 2, the flow of notifications and event reports at the agent application is illustrated. When an event occurs at a managed object 20, the object issues a notification with parameters 1 through N. Object 20 might be a program object or a physical resource, and an event might be completion of a task, request for a resource, failure of a resource, etc. The notification is compiled into a Potential Event Report (PER) 22 by the agent application program. The PER is forwarded to all Event Forwarding Discriminators (EFDs) 24, 26 and 28. The EFDs discriminate as to whether the PER satisfies the criteria of discrimination for forwarding to one or more managers. EFD 26 concludes the criteria is met, and forwards the PER as an Actual Event Report (AER) 30 to the manager.

The manager and application programs in FIG. 1 run on an operating system in an appropriate open system. FIG. 3 is exemplary of hardware to implement the invention. The open systems are IBM Personal System/2 computers connected to each other through communication adapters 32 and 34 via a token ring local area network 36. The communication adapter is connected to the I/O bus in each PS/2 computer. Each PS/2 computer has a local bus and an I/O bus. The local bus interconnects the microprocessor 38, 40, memory and memory control 50, 52 and I/O bus through I/O control 54, 56. The I/O control through the I/O bus provides access to I/O devices, such as the display 42, 44, the keyboard 46, 48, disk storage 58, 60, the communication adapters 32, 24, printers (not shown), etc. The operating system running on this hardware is OS/2, and the communications software running on OS/2 is OS/2 Communications Manager. The manager and agent application programs run on top of OS/2 Communications Manger.

While the invention is implemented in this preferred embodiment on PS/2 computers running the OS/2 operating system, any number of other open computing platforms might be used, such as the IBM RS/6000 running AIX operating system, the IBM AS/400 running OS/400 operating system or IBM System 390 running MVS or other operating systems.

Figure 4A:
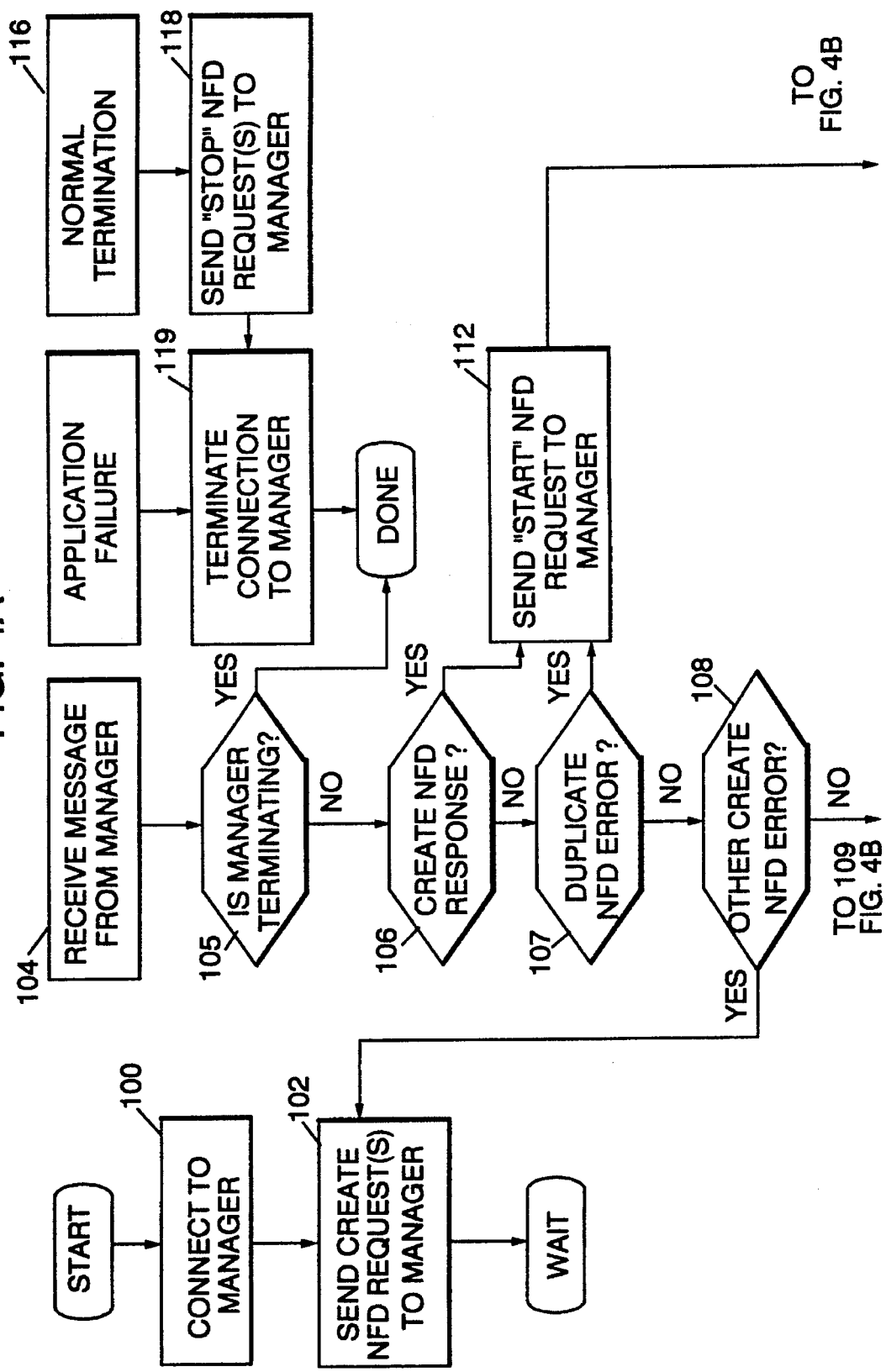

The processes for creating and using a Notification Event Forwarding Discriminator (NFD) begin with FIG. 4. In FIG. 4, the process, or logical operation of the application at the manager, is shown as a flow chart, and begins as a bit of start up logic. In operation 100, the application connects to the manager, and then at step 102, sends out a create NFD request—possibly one or more such requests to the manager process. Then, the application sits and waits to get messages from the manager. In FIG. 8, the data flow during initial set up is shown. The Create NFD request originates at the application, and goes through the manager to the agent. In response to this request, there are three possibilities. First, the create could complete successfully, second, the NFD might already exist and a duplicate object error response would be sent back by the agent, and third, the create operation is not successful, and an error response is returned by the agent.

In FIG. 4, the application, after being started, waits until it receives a message from the manager at operation 104. This message is tested by decision operations 105 through 111 to process the message. Decision block 105 checks whether the message indicates the manager is terminating. If the answer is no, the process branches to decision operation 106 to test whether the message is a create NFD response. If the answer is yes, indicating an NFD has been created, operation 112 sends a start NFD request to the manager process. In FIG. 9 data flow, this initialization is shown. The Start Request goes from the application through the manager to the NFD. The NFD starts to monitor the resources via managed object instances at the agent.

If the response is not a create NFD response, the process branches no from decision operation 106 to decision operation 107. Decision 107 is checking for the second possibility in the FIG. 8 data flow; i.e., was the response a duplicate object error message. In that case, the manager can just use that duplicate NFD. Therefore, the application, at operation 112, sends the start request to the manager who sends the request on to the NFD. Again, the NFD begins to monitor physical resources through the managed object instances.

If the answer to decision 107 is no, the next decision operation tests whether the response indicates some other type of error in the create NFD process. This third possibility in the FIG. 8 data flow indicates the NFD was not created. Hopefully, this error condition is just transient in nature, so that a subsequent create NFD request will be successful.

Assuming the create request was successful or a duplicate NFD was found, the data flow is depicted in FIG. 9 entitled INITIALIZATION, NORMAL OPERATION, AND TERMINATION. The start request, sent by operation 112, may trigger one or more start responses. At the top of FIG. 9, the start request is going from the application to the NFD. What happens some time after that, and on a periodic basis, is that other managed object instances are emitting notifications that the NFD decides it will forward back to the application as Start Responses (notification).

In FIG. 4, the application process, after decision operation 108, is checking in decision operation 109 if the response is a Start Response (notification) and is flagged "not last". If the answer is yes to that, then new information has been received saying that some status at a managed object instance has changed. Step 114 does whatever processing is necessary for that information, and then the application process waits for more responses (other Start Response notifications) to come in. In effect, the Start Request tells the NFD to start monitoring the resources. Any time the NFD detects a change via one of the notifications from a Managed Object Instance (MOI) and decides the notification needs to be forwarded to the manager application, the application process in FIG. 4 gets back as a Start Response (notification). Note that this is not the end of the start operation. The interchange between the application at the manager and the NFD at the agent leaves the start operation always pending completion (i.e., always open). That is what is meant by the Start Response message being flagged as "not last." This is not the last response the application will see for that Start Request to the NFD, there will be more. Start Response (notifications) might be status changes or updated information.

In FIG. 4, a normal termination of a NFD begins at operation 116. When the application, for whatever reason, carries out a normal termination, the application in step 118 sends Stop Request for the NFD to the manager process, and then in step 119 terminates the connection to the manager process. The connection to the manager is also terminated in the event of an application failure, the other input to step 119. The application process is now done until restarted at operation 100.

Returning to the Stop Request, the application could send this request periodically as, for example, to stop monitoring a part of a communication network or a particular node or whatever physical resource. As a result of this Stop Request being sent out, the NFD will respond that it acknowledges the stop operation, and sends back a Stop Response (see FIG. 9). The NFD also terminates its start operation (monitoring). The NFD sends back one more Start Response, but this time it is flagged as the "last response" or "done." In effect, the NFD tells the application this is the last response you will receive for this start operation. The NFD actually sends back two separate responses. When decision operation 110 detects the Start Response (done) (i.e., last Start Response), operation 120 then cleans up the monitoring thread (process) in the application for this NFD that has been stopped. The application then waits for the next message.

Now assume there has been a failure in the system. In the FIG. 10 data flow diagram, a LINK FAILURE is indicated. In effect, the application sends the Start Request the system is operating normally, and then the communication link between the manager and the agent fails. The manager process detects that failure. Also, the manager has kept track of all of the operations started by requests that have been sent over that link that those operations have not been completed yet. In other words, for each pending operation, the application sent the Start Request and has never gotten back a message saying this is the last response (done) for the start operation. That operation is still in a pending state. The manager process concludes that, with this link down, I'm never going to get the last response from the agent; i.e., it can't send it to me. Therefore, manager then cleans things up internally, and for all of the operations that were pending completion over that failed link, the manager will generate error responses and send them back to the application. The application then knows that this is the end of the start operation and they had a failure.

Figure 10:
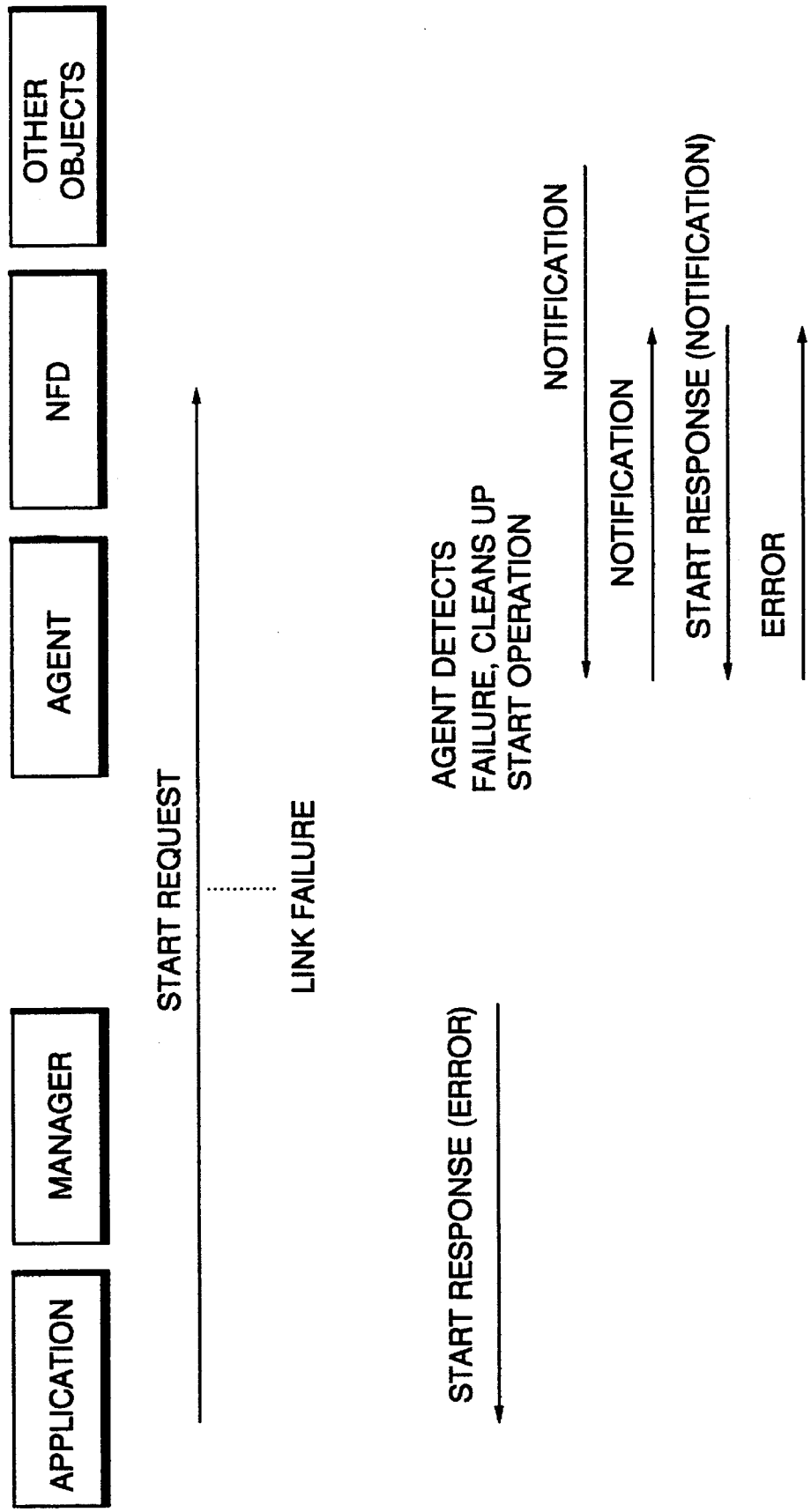
FIG. 10 shows the data flow between manager application, manager, agent, NFD and other managed object instances when a communication link failure occurs.

The Start Response (error) in FIG. 10 data flow is from the manager process to the application process when the manager detects link failure. In FIG. 4, decision operation 111 detects this message from the manager. This message is a signal to the application that the monitoring is no longer working, so the application process branches to step 122. In step 122, the application performs special processing, such as (1) warning that it is no longer sure about the status of the resource it is monitoring, or (2) trying to re-establish connection with NFD another way.

If the answer to the last decision 111 is no, the only remaining message possibility is Stop Response detected by operation 124. Just as for Start Response (done), a Stop Response causes operation 120 to clean up the monitoring thread for this operation of the NFD. This completes the operations performed by the application process.

Figure 5A:
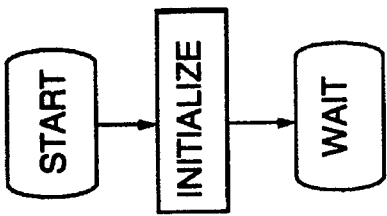
Figure 5D:
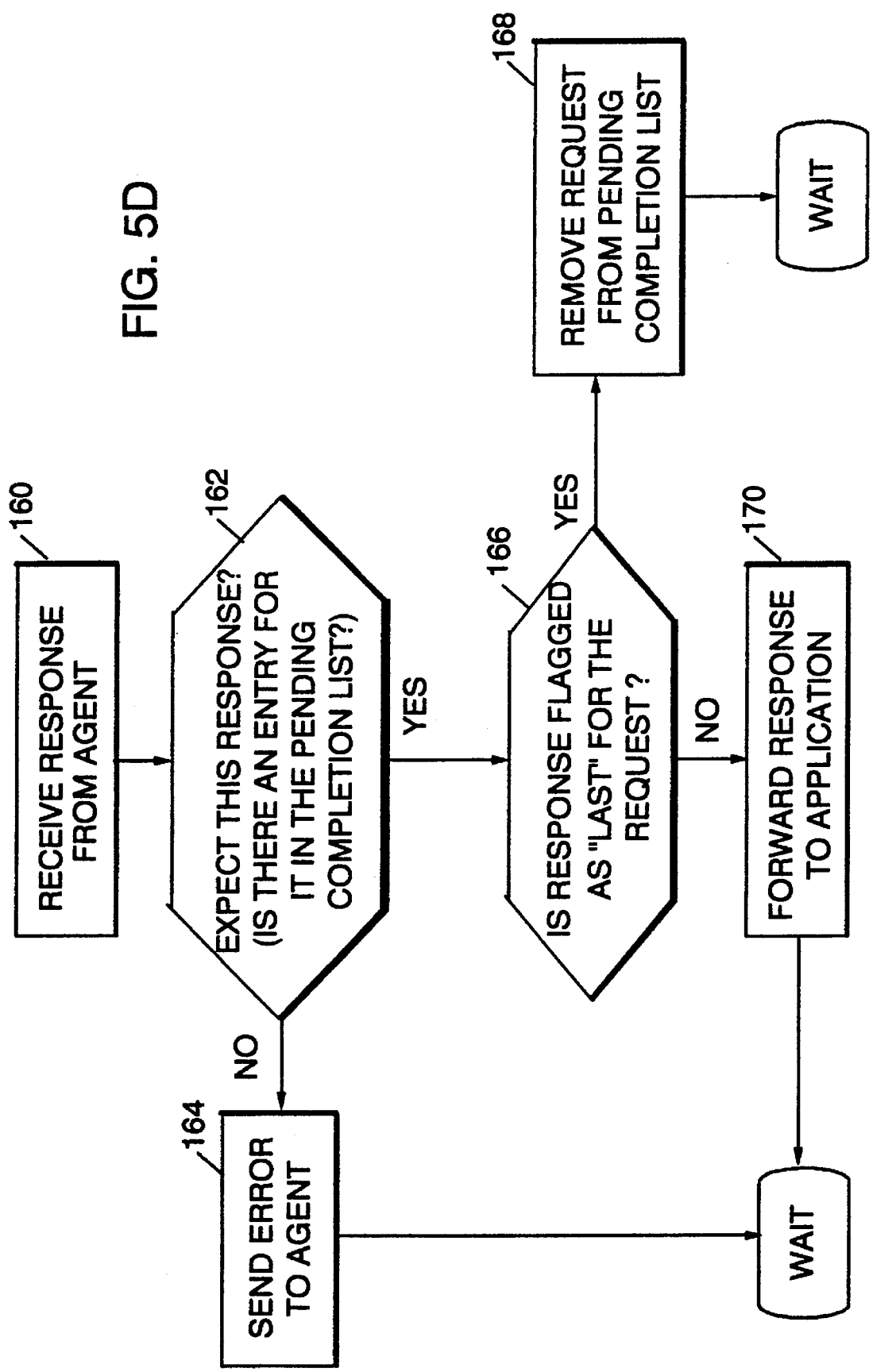

In FIGS. 5A, 5B, 5C and 5D, the manager process or logical operations flow is shown. FIG. 5A initializes the manager process, and FIG. 5B illustrates the manager process for handling messages from applications—these messages are requests that manager will probably end up sending to the agents. FIG. 5C illustrates manager process termination. FIG. 5D illustrates the manager process for handling responses from agents.

In FIG. 5B, operation 130 receives the message from the application. Decision operation 132 then checks to see if the message is a request to connect the manager to the application so the application may start talking through the manager to agents. If the message is a connection request, step 134 establishes the connection. The manager then waits for other things to happen.

If the message is not a connection request, decision operation 136 tests whether the message is a terminate connection request, or whether there has been an application failure. If the answer is yes, the manager must take action to clean up pending completion lists because the application has gone away. Operation 138 accomplishes this by removing, from the pending completion list, all requests issued by the application. The manager then goes to the wait state.

If the message is neither a connect or terminate connect message, the message must be a request destined for an agent, and the process is at decision operation 140. Decision operation 140 checks to see if a communication link between the manager and the agent is established. If the link is not established, operation 142 establishes the link, and creates a pending completion list for requests over that link. If there is a link, or once a link is established, operation 144 uses it to send the request to the agent. Next, step 146 adds the request to the pending completion list. By using this list, the manager remembers that it has sent out a request, and that it has to wait for a response to this request that's marked "last". After adding the request to the list, the manager in decision operation 148, checks to see if there was a link error. If not, the system operation is normal, and the manager waits for more messages to come in. If there is a link error, this means the communication link is dead, and the manager, in operation 150, looks in the pending completion list table at all of the requests sent out over that link that were pending completion. These requests are cancelled, and error messages for them are generated and passed back to the application. Operation 150 performs these same tasks if manager detects a link failure at step 152, or the agent has terminated the link as detected at step 154.

In FIG. 10, the data flow diagram for LINK FAILURE, a Start Response (error) flows from the manager to the application. This message is being generated by operation 150 in FIG. 5B. The detect link failure operation 152 is where the communications transport tells the manager that the link has terminated. The one other case where operation 150 is triggered is where the agent decides to terminate the link, perhaps because the agent terminated. In any case, operation 150 does the same processing— cancels all the requests in the applicable pending list, and return errors for those requests to the application.

Figure 12:
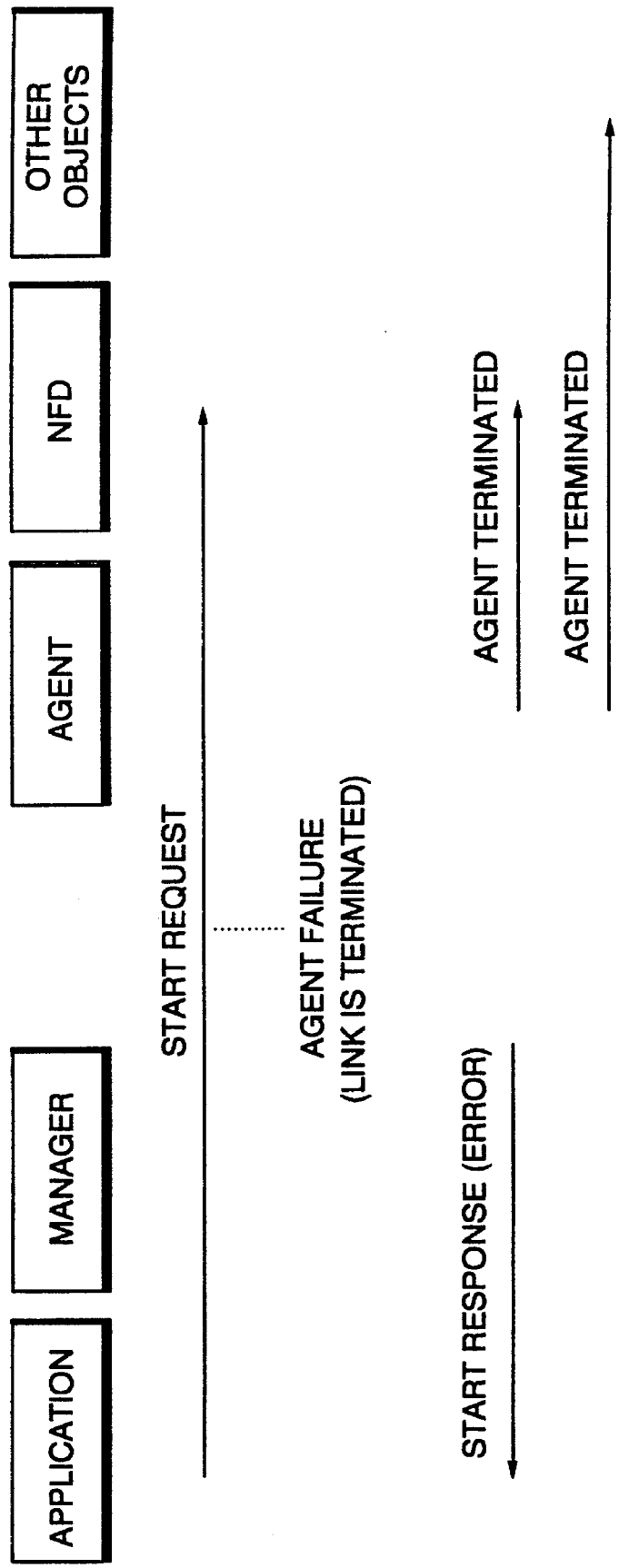
FIG. 12 shows the data flow between manager application, manager, agent, NFD and other managed object instances when the agent process fails.

The data flow for agent failure is illustrated in FIG. 12. The manager picks up on the fact that the agent has terminated the link, and sends the Start Response (error) to the application.

Figure 11:
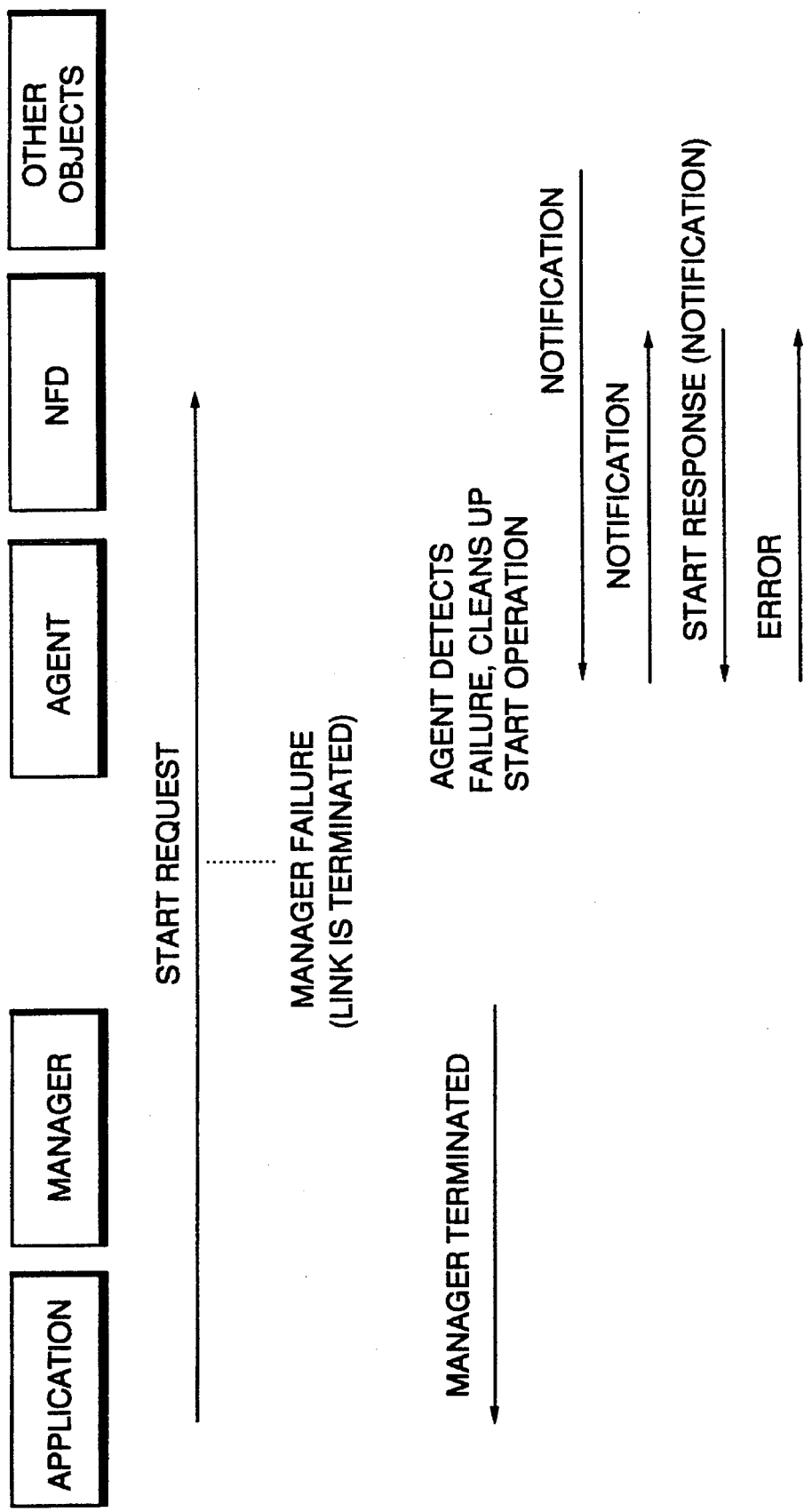
FIG. 11 shows the data flow between manager application, manager, agent, NFD and other managed object instances when the manager process fails.

In FIG. 5C, the process flow for manager process failure, or termination, is shown. In operation 156, the manager is terminated or fails. As the manager terminates, the process in step 158 terminates all of links that it has to all of the agents it's been talking to, and it terminates all of its connections to all of the applications it has been serving. The data flow shows up in FIG. 11 entitled MANAGER FAILURE. Operation 158 then sends a message to the application saying Manager Terminated.

In FIG. 5D, the process, or logical operation flow for the manager process handling responses from the agent, is shown. Operation 160 receives the response message from the agent, and decision operation 162 tests whether the manager is expecting a response. In other words, is there a request on the pending completion list that the agent response is a reply to? If not, it means that the application has gone away and the request was removed from the pending completion list. The process branches no from decision 162, and operation 164 sends an error back to the agent saying the manager doesn't understand this operation any more; i.e., the operation no longer exists as far as the manager is concerned.

Figure 14:
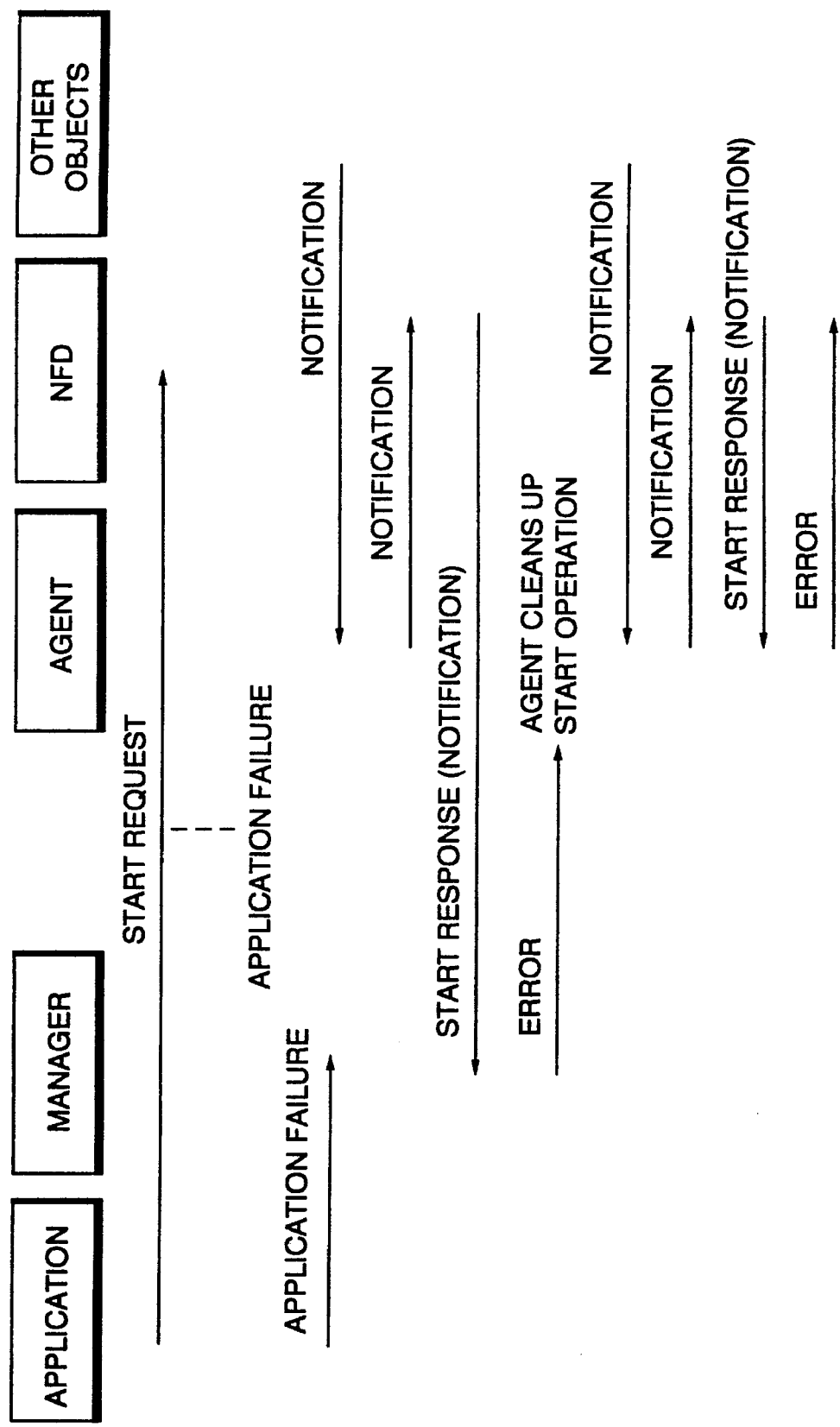
FIG. 14 shows the data flow between manager application, manager, agent, NFD and other managed object instances when the application process at the manager system fails.

An example of this data flow is shown in FIG. 14 entitled APPLICATION FAILURE. When the manager receives its Application Failure message, what the manager will do, is it will cancel all of the requests that application had issued, but did not receive the final response for. It removes those entries from its pending completion list table. At some point, the NFD may send a response to a start operation that has been issued by this application that has failed and no longer exists. The NFD sends a Start Response (notification) back to the manager, the manager then determines that this must be a response to some request that it knows about, it looks in its table and discovers that there are no requests that match up with this response. The manager then sends an Error to the agent that in effect says "we're a little out of sync, I don't know about this response you sent me, I don't think you should have sent it". The agent will then do a similar sort of clean up as done by the manager.

In FIG. 5D, normally the manager process is expecting the response. The answer to decision operation 162 is yes, and the process branches to decision operation 166. In operation 166, the manager process checks to see if the response is flagged as the last response to the request. If it is, then operation 168 removes the request from the pending completion list table, and the process goes to the wait state. If it is not the last response, then we leave the request in the table, and operation 170 forwards that response to the application. This completes the possible operations of the manager process.

The process, or logical operation flowchart for the agent process, is shown in FIGS. 6A, 6B and 6C. The first thing that happens at operation 172 in FIG. 6A is that the agent receives a message from some place. The message could be from the manager, or one of the managed object instances the agent is supporting. Decision operation 174 tests whether the message is from a manager. If the answer is no, the message is from one of the managed objects. Decision operation 176 checks whether the message is a connect request from a managed object. If it is, operation 178 establishes a connection with the managed object, and then the agent waits for other responses to come in.

If it is not a connect request, decision operation 180 tests whether it is a terminate connection request from a managed object. In the case of an NFD object, the NFD would typically not terminate the connection unless it was failing, because once it's created, the NFD just runs; it never really terminates. If the agent gets one of these termination requests from an NFD, it is probably because there is some sort of catastrophic problem with the NFD. If it is a terminate connection request from an object, operation 182 returns an error for all requests that the managed object has not completed. The agent then goes to the wait state.

If the message is not a terminate request, decision operation 184 questions whether the message is a notification from the managed object. If it is, operation 186 forwards notification to all of the NFDs. In FIG. 9, data flow for normal operation, the Notification flows from other objects to the agent and then to the NFD. After the agent has forwarded the notification to the NFD in operation 186 of FIG. 6A, it goes to the wait state.

If the message is not a notification, decision operation 188 is testing whether the managed object is sending a response to some request and, typically, the answer is yes. However, if the message is a response to a request and the agent is not expecting a response to the request, operation 190 sends an error message back to the object. In effect, the manager and agent have agreed that this operation should be cancelled.

In FIG. 14, data flow for application failure there is an example of a notification from other objects to the agent where the agent is not expecting a response. Assume an application is no longer around; there's no need to remember about its requests any more. The manager takes the buffer of pending responses, finds which ones belong to this particular application, and purges them from the buffer. At some point in the future, starting way out on the agent system, one of the managed objects will emit a notification eventually that makes its way to the NFD. The NFD decides that it will forward it as a response to the start operation, sends it through the agent all the way to the manager. The manager then sends an error back to the agent saying that it is no longer expecting responses to this request. The agent decides that some failure has happened on the other end, so it cleans up its buffer so that it too no longer recognizes that operation. The next time this scenario happens, where the other object sends a notification to the NFD and the NFD tries to send a response, the agent will stop it, and send a message back to the NFD saying that its not expecting a response to that operation. That's when the NFD finally knows that the application has died, and terminates this invocation of the start command. The application failure, in this situation, is at the manager's side.

In FIG. 6A, normally operation 188 is expecting a response to the request, and the process branches yes to decision operation 192. Decision 192 checks to see if this is the last response. If it is, operation 194 removes the request from the agent's pending completion list by marking the request as no longer pending. Operation 196 sends the response to the manager. If the response isn't flagged as the last response, the agent just forwards the response on to the manager. Next, decision operation 198 tests for any sort of error over the communication link back to the manager. If an error is detected, operation 200 will send an error to the managed object letting it know that there is a link failure, and it can stop the operation. This completes the agent process for handling messages received from managed objects.

With regard to handling messages from a manager, decision operation 174 detects that the message came from the manager. Decision operation 201 tests whether the message indicates a new communication link has been established; i.e., a new manager is making a request. If the answer is yes, operation 203 creates a pending completion list for that link, i.e., that manager. The agent process then proceeds to decision operation 202. If the answer to decision operation 201 is no, the agent process branches directly to decision operation 202.

Decision operation 202 checks whether the message from the manager indicates that the manager has purged its pending completion list, and no longer knows about a request that the agent still has some trace of. In FIG. 14 data flow diagram, this is indicated by the Error message that goes from the manager to the agent. If it is an unknown request error message from the manager, operation 204 goes to the agent's pending completion list, and removes that particular operation from the pending completion list in the agent.

If message is not an unknown request error, operation 205 adds the request to the pending completion list at the agent. Next, decision operation 206 checks to see if the message is a create NFD request. If it is, decision operation 208 first verifies if this particular NFD already exists. If it does, operation 210 will generate a duplicate object error, and send that to the manager. If the message is a create NFD, and the NFD does not exist, the request is forwarded by step 212 to an NFD handler. If the message is not a create request, the process branches directly from decision operation 206 to operation 212 to forward any other type of request to the NFD via the NFD handler.

The manager and the agent both take action based on a link failure. In FIG. 6B, the agent, at operation 214, is informed by the communication support that the link has died. The agent is not going to be able to send any responses to any requests that were pending completion over the link that died. Similarly, if by operation 216 the manager were to terminate the link with the agent, the effect on the agent is the same. In either event, operation 218 in the agent marks all request over the dead link as no longer pending completion at the agent.

In FIG. 12, the data flow during agent failure or termination is illustrated. The process flow is in FIG. 6C. The agent fails or terminates at operation 220. Operation 222 terminates all links and connections to objects, and sends a message to all of the objects that have connected to it, saying that the agent is going away. The agent is now done, it's terminated. The NFD and other managed objects will most likely quickly and quietly go away because there's not much they can do at that point.

Figures 2, 7B:
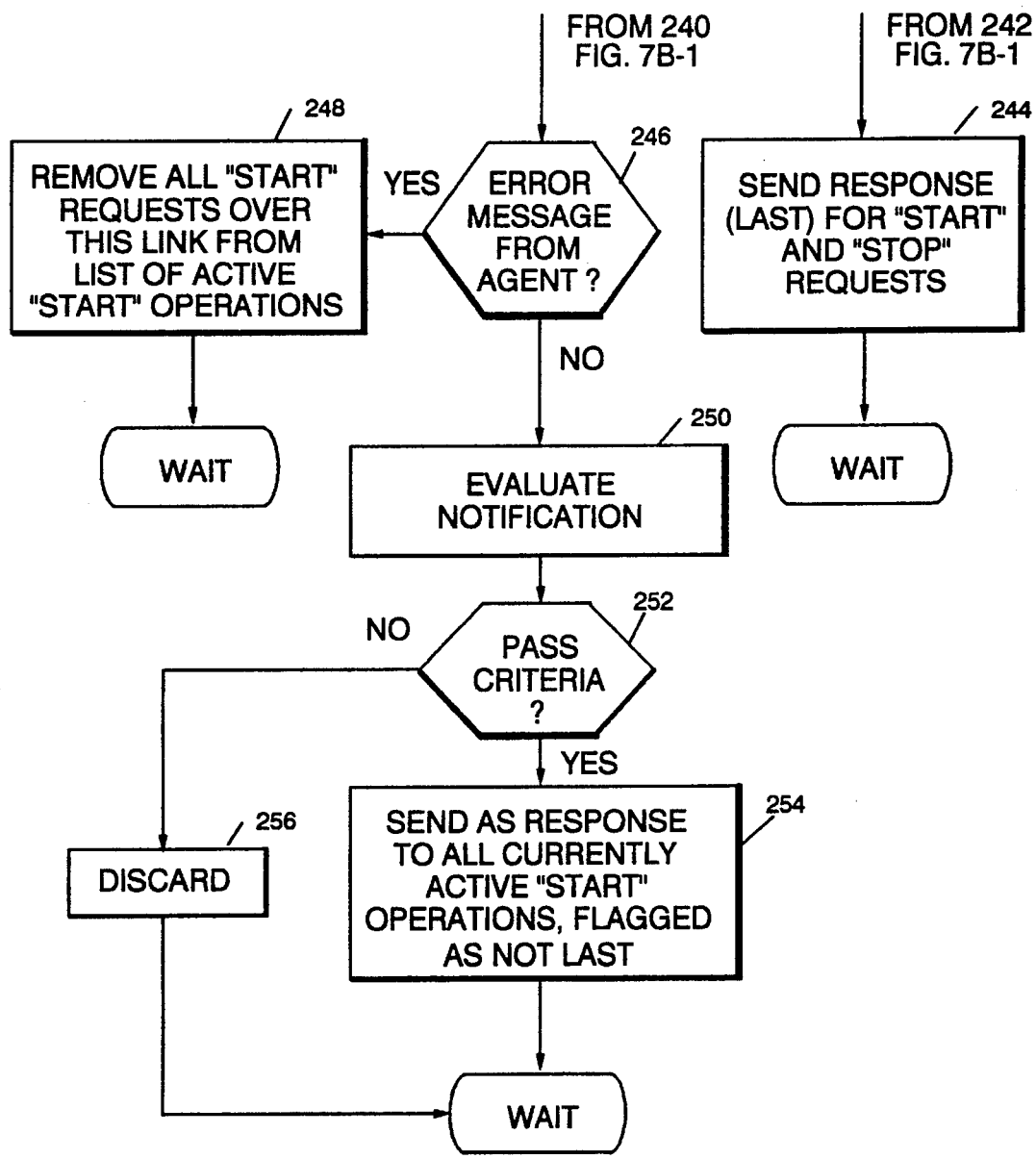

The process and logical operation flow at the NFD in the preferred embodiment of the invention is illustrated in FIGS. 7A and 7B. FIG. 7A simply illustrates initialization of the NFD which consists of operation 224 connecting the NFD to the agent, and then the NFD process waiting for messages from the agent. Connecting to the agent is just part of what it knows to do in order to communicate with the outside world. In FIG. 7B, the NFD is waiting until operation 226 receives a message from the agent. After receiving the message, decision operation 228 checks to see if the agent is terminating. If it is, the NFD gives up (done). If not, decision operation 230 checks to see if this is a create request. If yes, operation 232 performs the create operation, and sends back a message saying whether or not the create NFD operation worked.

If the message was something other than a create request (e.g., a start request), decision operation 234 detects the Start Request. Operation 236 in the NFD will now remember that someone has requested it to start forwarding notification back to him by adding the Start Request to a list of active start operations. The information in the list of start operations includes a list of interested parties—managers interested in notifications from the NFD. More than one manager can use the same NFD. After adding to the list, the NFD waits for messages.

If the message is not a start request, decision operation 238 tests for a stop request. A stop request refers back to some start request that is to be completed. If it is a stop request, operation 242 determines which start request is terminated, and removes it from the NFD's list of active start operations. Operation 244 sends a response to the start request saying that this is the last response you are going to receive, and that ends the start operation. That stop request is directed to a particular manager who initiated the start request. Operation 244 must also send a response to the stop request back to the manager through the agent.

If the message is an error message from the agent, decision operation 246 detects the error message. Operation 248 removes all of the start requests over that particular link from the list of active start operations (subscription list). If the message isn't an error message, the only other possibility is that it's a notification from some other managed object that the agent has forwarded to the NFD. Operation 250 evaluates the notification just as would any event forwarding discriminator. If it passes the event forwarding criteria, as tested in decision operation 252, operation 254 will encapsulate the notification within a start response, and send it back to the manager through the agent. Also, operation 254 marks that response as "not last". If the notification does not meet the event forwarding criteria, step 256 discards the notification.

Figure 13:
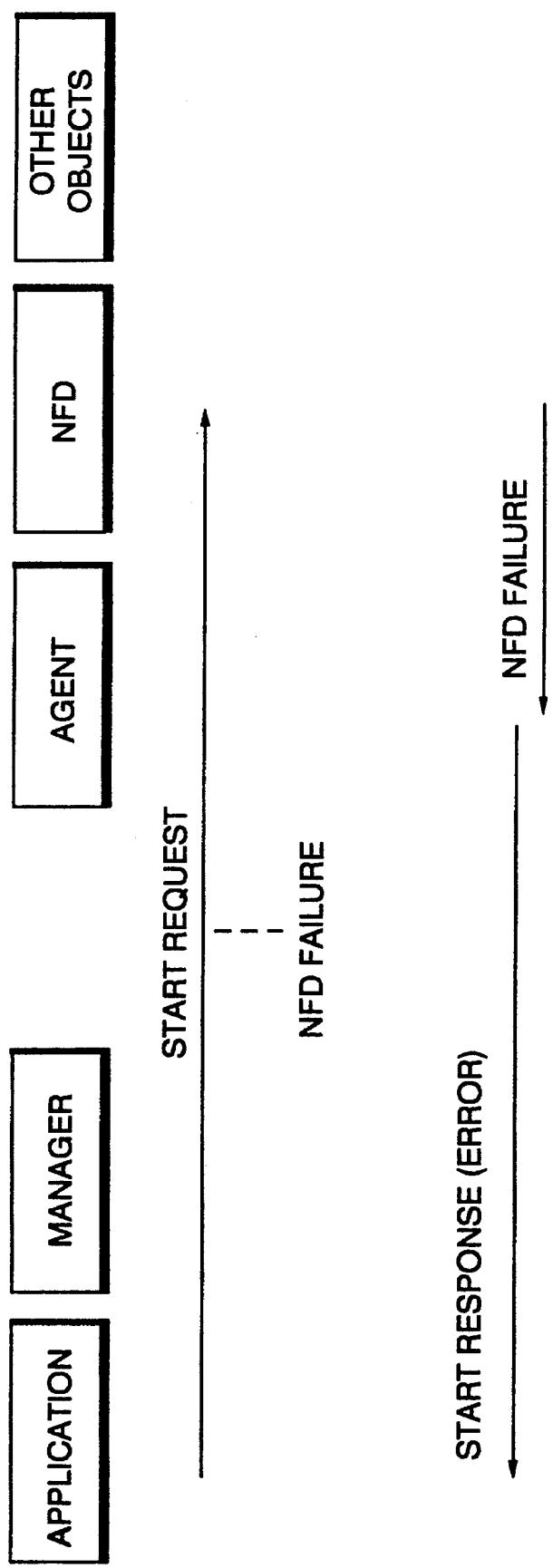
FIG. 13 shows the data flow between manager application, manager, agent, NFD and other managed object instances when the NFD process fails.

Also, at the top of FIG. 7A, there is a process flow for NFD failure. When the NFD fails, as detected at step 258, operation 260 sends a request to the agent saying that it is terminating it's connection to the agent and going away. The NFD is then done. For example, in FIG. 13, the data flow diagram entitled NFD FAILURE there is NFD Failure message going from the NFD to the agent. That's this terminate connection request. The agent will then send error responses to the manager saying that the NFD object has died, and the manager will not receive any more information from this NFD. This completes the NFD process.

It will be apparent to one skilled in the art that there are many paths through the processes and logical operation of the preferred embodiment.

While the exemplary preferred embodiments of the present invention are described herein with particularity, those having normal skill in the art will recognize various changes, modifications, additions and applications other than those specifically mentioned herein without departing from the spirit and scope of this invention.

What is claimed is:

1. In interconnected computing systems having a manager process in a first system and an agent process in a second system with said manager process managing resources in said second system with managed objects that issue information notifications about the resources, a method for monitoring the resources comprising the steps of:

in response to a create request from an application in the first system, establishing a new communication link between a manager process in the first system and an agent process in the second system;

creating a manager's pending completion list in the manager process for the new link, said manager's list for listing operation requests sent from application processes through the manager process to the agent process;

adding pending operations to the manager's pending completion list for each start operation request from applications in the first system, said start operation requests for starting an operation at a Notification Forward Discriminator (NFD) to monitor notifications from a managed object;

detecting the new communication link at the agent process in the second system;

in response to said detecting step, creating an agent's pending completion list in the agent process, said list for listing operation requests sent by applications in the first system to start notification forwarding from the NFD to the applications;

adding pending operations to the agent's pending completion list for each start operation request from applications in the first system; and sending NFD responses from the agent to an application that has pending operation listed in the agent's pending completion list until the application, that started the pending operation with a start request, issues a stop request.

2. The method of claim 1 further comprising the steps of:

detecting at the manager process a link failure;

removing all pending operations associated with the failed link from the manager's pending completion list; and sending a error message to each application with a pending operation removed from the pending completion list.

3. The method of claim 1 further comprising the steps of:

detecting at the agent process a link failure; and removing all pending operations associated with the failed link from the agent's pending completion list.

4. The method of claim 3 further comprising the steps of:

receiving at the agent process an operation response from the NFD;

detecting no pending operation in the agent's pending completion list for the response received from the NFD; and sending an error message to the NFD indicating no pending operation for the operation response sent by the NFD.

5. The method of claim 1 further comprising the steps of:

detecting at the manager process an application failure; and removing all pending operations for the failed application from the manager's pending completion list.

6. The method of claim 5 further comprising the steps of:

receiving at the manager process an operation response from the NFD through the agent process;

detecting no pending operation in the manager's pending completion list for the response received from the NFD;

sending an error message to the agent process indicating no pending operation for the operation response sent by the NFD; and removing the pending operation for the operation response from the agent's pending completion list.

7. The method of claim 6 further comprising the steps of:

receiving at the agent process an operation response from the NFD;

detecting no pending operation in the agent's pending completion list for the response received from the NFD; and sending an error message to the NFD indicating no pending operation for the operation response sent by the NFD.

8. The method of claim 1 further comprising the steps of:

terminating all communication links to a manager and all connections to application processes from the manager when the manager fails.

9. The method of claim 8 further comprising the steps of:

detecting at the agent process a link termination; and removing all pending operations associated with the terminated link from the agent's pending completion list.

10. The method of claim 9 further comprising the steps of:

receiving at the agent process an operation response from the NFD;

detecting no pending operation in the agent's pending completion list for the response received from the NFD; and sending an error message to the NFD indicating no pending operation for the operation response sent by the NFD.

11. The method of claim 1 further comprising the steps of:

receiving at the NFD a start operation request;

adding the operation for the start operation request to an NFD list of active start operations;

evaluate notifications from managed objects to determine if each notification passes the criteria for forwarding the notification to an application process; and send a response with the notification to the agent process for forwarding to all applications having a start operation request on the NFD list of active start operations.

12. The method of claim 11 further comprising the steps of:

receiving at the NFD a stop operation request from an application process, the stop operation request for stopping a monitoring operation started by a corresponding start operation request to the NFD; and removing the corresponding start operation request from the NFD list of active start operations.

* * * * *